United States Patent [19]
Goddard

[11] Patent Number: 5,767,934
[45] Date of Patent: Jun. 16, 1998

[54] LIQUID-CRYSTAL DISPLAY WITH FOIL HEATER AND PTC SENSOR FOR BACKLIGHT

[75] Inventor: George Goddard, Wendelstein, Germany

[73] Assignee: Robert Bosch GmbH, Stuttgart, Germany

[21] Appl. No.: 615,028

[22] Filed: Mar. 13, 1996

Related U.S. Application Data

[63] Continuation of Ser. No. 232,211, May 3, 1994, abandoned.

[30] Foreign Application Priority Data

Nov. 13, 1991 [DE] Germany ............ 41 37 260.3

[51] Int. Cl.$^6$ ................................ G02F 1/13
[52] U.S. Cl. ............... 349/61; 349/72; 313/13; 313/547; 313/595; 315/50; 315/115; 219/485
[58] Field of Search ............ 349/61, 72; 313/13, 313/15, 547, 595; 315/15, 115; 219/485

[56] References Cited

U.S. PATENT DOCUMENTS

| | | | |
|---|---|---|---|
| 3,996,493 | 12/1976 | Davenport et al. | 315/50 |
| 4,366,416 | 12/1982 | Yokoyama | 315/58 |
| 4,645,974 | 2/1987 | Asai | 315/50 |
| 4,868,459 | 9/1989 | Dennerlein et al. | 315/158 |
| 4,931,685 | 6/1990 | Dobashi et al. | 313/15 |
| 4,950,053 | 8/1990 | Haim et al. | 350/345 |
| 5,051,648 | 9/1991 | Misono et al. | 313/13 |

FOREIGN PATENT DOCUMENTS 58-198850  11/1983  Japan.

*Primary Examiner*—William L. Sikes
*Assistant Examiner*—Kenneth Parker
*Attorney, Agent, or Firm*—Michael J. Striker

[57] ABSTRACT

A liquid-crystal display arrangement consisting of a liquid-crystal display, a light source constructed as a fluorescent lamp and a heat source which is thermally coupled to the fluorescent lamp. The heat source is formed as an essentially flat sheet on the side of the lamp opposite the display, with the heat source connected is series with a PTC type temperature sensor. In order to achieve a uniform and rapid establishment of the optimum operating temperature of the fluorescent lamp, the heat source is formed by a temperature-controlled foil-type heating element.

3 Claims, 2 Drawing Sheets

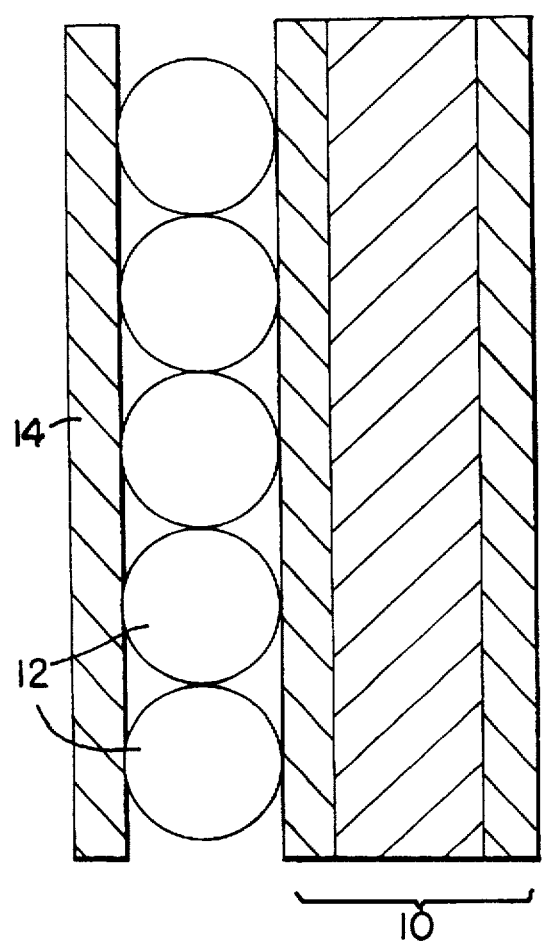

LIQUID-CRYSTAL DISPLAY WITH FOIL HEATER AND PTC SENSOR FOR BACKLIGHT

This is a continuation of application Ser. No. 08/232,211 filed May 3, 1994 now abandoned.

FIELD OF THE INVENTION

The invention relates to a liquid-crystal display arrangement according to the preamble of claim 1.

BRIEF DESCRIPTION OF THE PRIOR ART

The invention relates to a liquid-crystal display arrangement according to the preamble of claim 1.

Liquid-crystal display arrangements which have to be read both in bright ambient lighting and in darkness comprise a light source for background lighting of the liquid-crystal display. Special demands are placed on such a light source. It must offer a long service life and a high and uniform light yield, and must also offer a constant colour temperature when coloured liquid-crystal displays are used. These demands can be fulfilled by a light source which is constructed as a fluorescent lamp.

JP-A-58-198,850 discloses a fluorescent lamp which is coated with a temperature-controlled foil-type heating element. The foil-type heating element is controlled by a temperature controller which is coupled to a temperature sensor and receives therefrom control signals for the ambient temperature. This arrangement is relatively complicated, since in addition to the temperature sensor there is also a need for an additional temperature controller.

A serious disadvantage of fluorescent lamps consists, however, in that their illumination level is a function of temperature and that, particularly in the case of low ambient temperatures, that is to say below plus 10° C., they continue to operate only unsatisfactorily or even no longer work at all.

DE-OS 3,742,245 discloses a liquid-crystal display system in which fluorescent light sources and incandescent light sources are provided for lighting a liquid-crystal display. The fluorescent light sources, which offer a high light power, supply their maximum light yield, however, only at ambient temperatures of plus 40° C.–50° C. In order to facilitate lighting of the liquid-crystal display at low temperatures, for example down to minus 50° C., additional incandescent light sources are provided, but they only have a low light power by comparison with the fluorescent light sources and can thus effect only a poor illumination. However, these incandescent light sources have the additional task of heating the fluorescent light sources, arranged adjacent, in the case of low ambient temperatures, and thus of bringing them to an operating temperature at which they can output their optimum light power.

A disadvantage of incandescent light sources in connection with the lighting of liquid-crystal displays consists, moreover, in that as predominantly punctiform light sources they cannot effect a uniform illumination of the display section nor heating of the fluorescent light sources, and additionally have only a short service life.

Furthermore, U.S. Pat. No. 4,206,501 discloses a lighting arrangement for the background lighting of display surfaces, in which a diffusing screen which is lit by punctiform light sources and is intended, by means of non-uniform blackening, to facilitate a uniform distribution of light onto the display section, is provided with a heating element. This heating element serves the purpose of heating the display section itself, so that the display can operate in an optimum temperature range.

SUMMARY OF THE INVENTION

It is the object of the invention in the case of a liquid-crystal display arrangement having a liquid-crystal display and a light source constructed as a fluorescent lamp to heat the fluorescent lamp uniformly and to keep it at a constant operating temperature.

This object is achieved in the case of a liquid-crystal display arrangement according to the preamble of claim 1 by means of the features specified in the characterizing part.

It is possible due to the temperature-controlled foil-type heating element to achieve homogeneous heating over a large area, and thereby also uniformly to heat the fluorescent lamp, which is coupled thermally to the foil-type heating element. It thereby reaches its optimum operating temperature faster than in the case of punctiform heating. Due to the fact that the operating temperature is low even in the case of maximum power of the foil-type heating element, a long service life is ensured, with the result that there is no need for maintenance work on the liquid-crystal display arrangement due to premature failure of the foil-type heating element.

Moreover, such liquid-crystal display arrangements can also be used without hesitation, for example, in motor vehicles or aircraft, in the case of which the correct functioning and reliability of the display is of decisive importance for traffic safety. In addition, there is also the possibility of undertaking integrated temperature control at the foil-type heating element itself, as is envisaged by a development having a thermally coupled PTC thermistor. The result of this is to effect close coupling and thereby to provide the preconditions for rapid control.

In a preferred embodiment, the foil-type heating element has a U-shape and a PTC thermistor is arranged between the limbs of the foil-type heating element.

The combination of a foil-type heating element and a PTC thermistor facilitates extremely simple electric circuitry, in that the two elements are connected in series to the supply voltage. Electronic control by means of active elements, which is otherwise necessary, can thus be eliminated. The result is to achieve the highest possible security against disturbances, for example due to high field strengths or overvoltages, without additional countermeasures, and in addition such a liquidcrystal display arrangement can be produced in large production quantities at exceptionally favourable prices.

Developments and advantageous embodiments of the invention follow from the claims, further description and the drawing, with the aid of which the invention is explained.

BRIEF DESCRIPTION OF THE DRAWINGS

FIG. 1 shows a longitudinal section through a liquid-crystal display arrangement according to the invention.

DETAILED DESCRIPTION OF THE PREFERRED EMBODIMENTS

A liquid-crystal display arrangement is represented in cross-section in FIG. 1. It comprises a liquid-crystal display 10, a light source constructed as a fluorescent lamp 12 and a heat source 14 on the side of the fluorescent lamp 12 averted from the liquid-crystal display 10. The heat source 14 is formed by a temperature-controlled foil-type heating element.

If the liquid-crystal display arrangement is used in a motor vehicle, ambient temperatures of down to minus 40° C. can occur. Under these ambient conditions, the illumination level of fluorescent lamps is very poor. Even at a temperature of plus 20° C. the fluorescent lamp still requires approximately 5 to 10 minutes time in order to reach its full brightness. In the case of ambient temperatures of plus 10° C. the full brightness is not reached. A loss of brightness of approximately 40% would occur.

With the aid of the foil-type heating element 14, when the liquid-crystal display arrangement is switched on the fluorescent lamp 12 is heated and heats up substantially more rapidly to its optimum operating temperature, which is approximately plus 40° C. in conventional designs. Due to the temperature control, the calorific power of the foil-type heating element 14 decreases and reaches a minimum value as soon as the optimum temperature for the fluorescent lamp 12 is reached.

Figure 3:
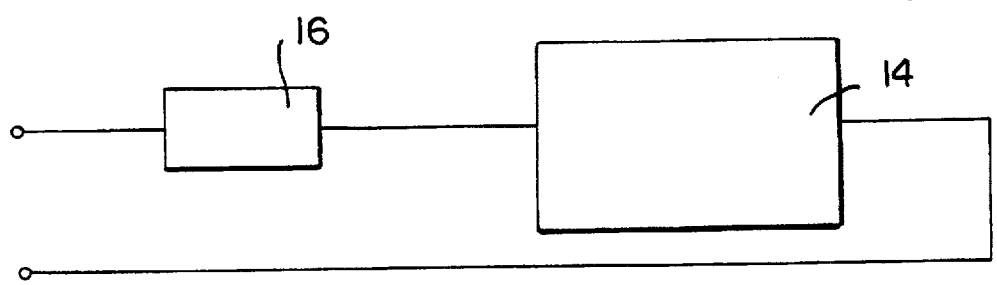
FIG. 2 shows a block diagram of the foil-type heating element and of the PTC thermistor and FIG. 3 shows a plan view of an advantageous embodiment of the foil-type heating element connected to the PTC thermistor.
Figure 2:
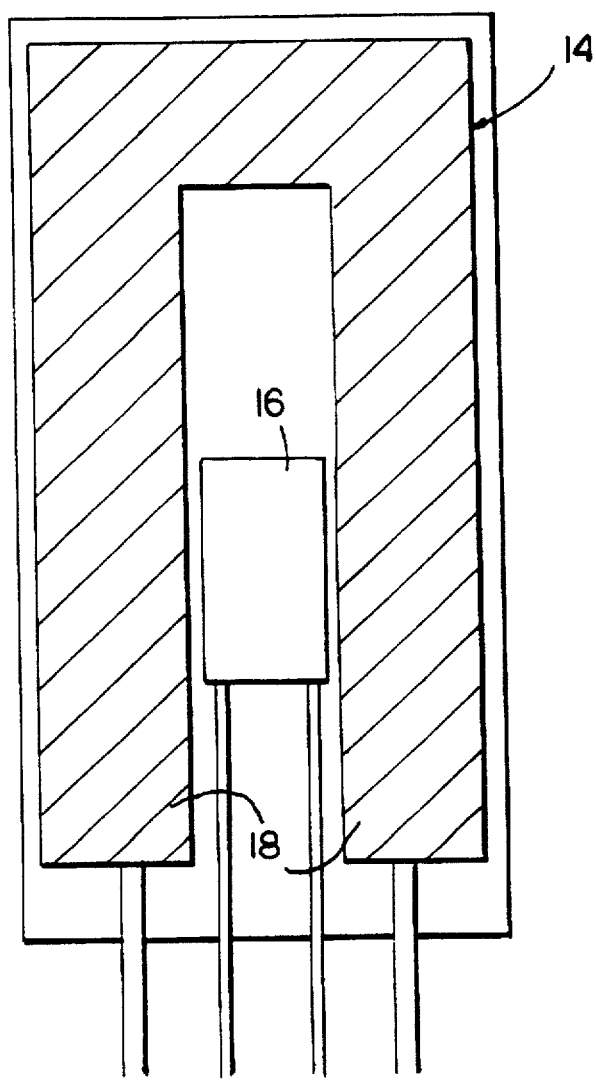

In a practical embodiment, as represented in FIG. 2, the foil-type heating element 14 has a U-shaped form. Located between the limbs 18 of the foil-type heating element is a PTC thermistor 16 which, as FIG. 3 shows, can be connected electrically in series to the foil-type heating element 14 and to the electric supply voltage. If the capacity of the supply network allows it, the foil-type heating element 14 could also remain permanently connected, in order to keep the fluorescent lamp 12 at operating temperature even when it is in the switched-off state, and thus to ensure maximum brightness of the fluorescent lamp 12 immediately after being switched on in the case of low ambient temperatures.

It is expedient to dimension the temperature-controlled foil-type heating element 14 for a maximum calorific power of approximately 25 watts and a minimum calorific power of approximately 7 watts. The minimum calorific power is reached after a continuous drop in conjunction with rising temperature when a temperature of approximately 40° C., which is appropriate for the optimum operating state of the fluorescent lamp, is established.

It is achieved as a result of the invention that the optimum operating temperature of the fluorescent lamp, and thus its highest light yield, is reached very rapidly independently of the ambient temperature. This light yield is maintained after a short settling time even if temperature fluctuations subsequently occur. As a result, the preconditions are also provided for ensuring a constant colour temperature of the emitted light, and thus for excluding colour distortions in the case of lighting of coloured liquid-crystal displays.

I claim:

1. A liquid-crystal display arrangement, comprising a liquid-crystal display; a light source formed as a fluorescent lamp located at one side of said display; a heat source which is formed as a generally flat sheet, located at a side of said fluorescent lamp opposite to said display and thermally coupled to said fluorescent lamp, said heat source being formed by a temperature-controlled foil-type heating element; and a PTC thermistor; said PTC thermistor being connected electrically in series to said foil-type heating element, said foil-type heating element and said fluorescent lamp are thermally coupled to said PTC thermistor.

2. A liquid-crystal display arrangement as defined in claim 1, wherein said foil-type heating element has a U-shaped configuration having limbs, said PTC thermistor being arranged between said limbs of said foil-type heating element.

3. A liquid-crystal display arrangement as defined in claim 1, wherein said temperature-controlled foil-type heating element has a maximum calorific power of approximately 25 W and a minimum calorific power of approximately 7 W, said minimum calorific power being establishable when a temperature approximately 40° C. is reached.

* * * * *